US009455103B2

(12) United States Patent
Matsuda

(10) Patent No.: US 9,455,103 B2
(45) Date of Patent: Sep. 27, 2016

(54) DIAL DEVICE

(71) Applicant: Olympus Corporation, Hachioji-shi, Tokyo (JP)

(72) Inventor: Masaki Matsuda, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/946,338

(22) Filed: Nov. 19, 2015

(65) Prior Publication Data

US 2016/0079016 A1   Mar. 17, 2016

Related U.S. Application Data

(63) Continuation of application No. PCT/JP2014/061890, filed on Apr. 28, 2014.

(30) Foreign Application Priority Data

May 23, 2013   (JP) ................................ 2013-109115

(51) Int. Cl.
*H01H 25/06* (2006.01)
*H04N 5/225* (2006.01)
(Continued)

(52) U.S. Cl.
CPC ........... *H01H 25/065* (2013.01); *H01H 19/14* (2013.01); *H04N 5/2251* (2013.01); *G03B 19/12* (2013.01); *G03B 2217/002* (2013.01);
(Continued)

(58) Field of Classification Search
CPC .... H01H 25/065; H01H 25/06; H01H 19/14; H01H 19/28
USPC ..................................... 200/566, 526, 43.18
See application file for complete search history.

(56) References Cited

U.S. PATENT DOCUMENTS

| 2,917,942 A | 12/1959 | Jarrett |
| 5,894,118 A | 4/1999 | Nishimoto et al. |
| 6,686,551 B2 * | 2/2004 | Pasotto ............. H01H 19/6355 200/566 |

(Continued)

FOREIGN PATENT DOCUMENTS

| JP | 10-041107 | 2/1988 |
| JP | 63-313435 | 12/1988 |

(Continued)

OTHER PUBLICATIONS

International Search Report to International Application No. PCT/JP2014/061890, mailed on Jul. 8, 2014 (1 pg.), with translation (1 pg.).

(Continued)

*Primary Examiner* — Felix O Figueroa
(74) *Attorney, Agent, or Firm* — John C. Pokotylo; Straub & Pokotylo

(57) ABSTRACT

A dial device according to the invention includes a fixed member, a rotating dial unit, a push button movable to a first position and a second position on an axis in a rotation center axis direction of the dial unit, a double knock mechanism that alternately holds the push button in the first position and the second position every time the push button is pressed, a moving and engaging member that moves on the axis in the rotation center axis direction of the dial unit in association with the first position and the second position of the push button, and a fixed side engaging section provided in the fixed member that is disengaged with the moving and engaging member when the push button is present in the first position and is engaged with the moving and engaging member when the push button is present in the second position.

19 Claims, 12 Drawing Sheets

(51) Int. Cl.
*H01H 19/14* (2006.01)
*G03B 19/12* (2006.01)

(52) U.S. Cl.
CPC ... *H01H 2221/01* (2013.01); *H01H 2221/044* (2013.01); *H01H 2221/052* (2013.01); *H01H 2231/046* (2013.01); *H01H 2239/03* (2013.01)

(56) References Cited

U.S. PATENT DOCUMENTS

| | | | | |
|---|---|---|---|---|
| 6,706,987 | B1 * | 3/2004 | Yoo | H01H 13/04 200/526 |
| 6,849,818 | B2 * | 2/2005 | Koide | H01H 19/28 200/564 |
| 7,465,897 | B2 * | 12/2008 | Horton | H01H 19/11 200/564 |
| 8,674,245 | B2 * | 3/2014 | Komatsu | B60N 2/0228 200/566 |
| 2007/0017789 | A1 | 1/2007 | Russo | |

FOREIGN PATENT DOCUMENTS

| | | |
|---|---|---|
| JP | 07-134320 | 5/1995 |
| JP | 11260194 | 9/1999 |
| JP | 2003-305990 | 10/2003 |
| JP | 2011-222240 | 11/2011 |
| JP | 4908648 | 4/2012 |

OTHER PUBLICATIONS

Extended Search Report to European Patent Application No. 14800486.4, mailed on May 27, 2016 (8 pgs.).

* cited by examiner

DIAL DEVICE

CROSS REFERENCE TO RELATED APPLICATION

This application is a continuation application of PCT/JP2014/061890 filed on Apr. 28, 2014 and claims benefit of Japanese Application No. 2013-109115 filed in Japan on May 23, 2013, the entire contents of which are incorporated herein by this reference.

BACKGROUND OF THE INVENTION

1. Field of the Invention

The present invention relates to a dial device that optionally enables rotation of an operation dial and prohibition of the rotation.

2. Description of the Related Art

Dial devices used in various apparatuses and the like are rotated by operation by operators in order to perform setting of operation of the apparatuses and the like. In some cases, rotation of the dial devices unintended by users needs to be prohibited.

For example, Japanese Patent Application Laid-Open Publication No. 7-134320 discloses a technique for, when rotating a dial, rotating the dial while pressing an unlock button. Consequently, it is possible to prohibit rotation of the dial unintended by a user and suppress occurrence of an abnormal operation of a camera.

Japanese Patent Application Laid-Open Publication No. 2003-305990 discloses content in which the conventional technology of a knock-type writing instrument is improved.

SUMMARY OF THE INVENTION

A dial device in an aspect of the present invention includes: a fixed member; a rotatable rotary member that rotates around a rotation axis according to rotating operation by an operator; a double knock mechanism including a pressed member movable to a first position and a second position on the rotation axis according to pressing operation by the operator, a follower that performs rotation around the rotation axis and movement in an axial direction according to the movement of the pressed member to the first position and the second position, and a control member that rotates the follower and controls movement of the follower in the axial direction corresponding to the first position and the second position of the pressed member in order to alternately hold the pressed member in the first position and the second position every time the pressed member is pressed; a moving and engaging member that is rotatable together with the rotation of the rotary member and movable in the axial direction relatively to the rotary section according to the axial direction position of the follower; a fixed side engaging section that is provided in the fixed member and is disengaged with the moving and engaging section and allows the rotation of the rotary member when the pressed member is present in the first position and is engaged with the moving and engaging member and prohibits the rotation of the pressed member when the pressed member is present in the second position; and an elastic member that urges the moving and engaging member in a direction from the second position to the first position of the pressed member and urges the pressed member in a direction from the second position to the first position via the moving and engaging member and the follower.

DETAILED DESCRIPTION OF THE PREFERRED EMBODIMENTS

Preferred modes of the present invention are explained below with reference to the drawings. Note that, in respective figures used in the following explanation, scales are varied for each of respective components in order to show the respective components in recognizable sizes on drawings. The present invention is not limited only to the numbers of the components, shapes of the components, ratios of sizes of the components, and relative positional relations among the respective components described in these figures.

First Embodiment

A first embodiment of the present invention is explained with reference to FIG. 1 to FIG. 7.

Figure 1:
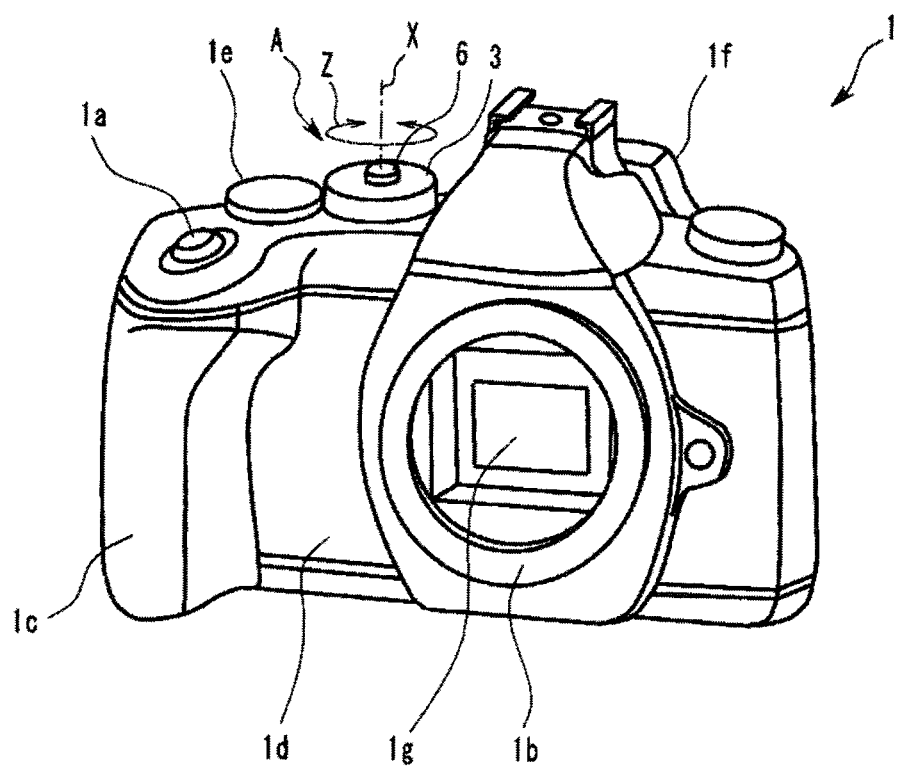
FIG. 1 is an exterior perspective view of an image pickup apparatus mounted with a dial device.

First, respective components are explained. FIG. 1 is an exterior perspective view showing, from a front obliquely above direction, a digital single lens camera 1 (hereinafter referred to as camera), which is an image pickup apparatus mounted with a dial device of the present invention. The camera mounted with the dial device of the present invention can optionally perform selection of a photographing mode and the like according to rotating operation of the dial device.

Note that, in the present embodiment, a dial of the dial device in FIG. 1 is rotatable in both directions, i.e., one direction and the other direction.

The camera 1 includes a body mount 1b in a front for attaching and detaching an interchangeable lens, a planar body front surface section 1d on a left side of the body mount 1b, a grip 1c forward on a left side direction viewed from the front, a release button 1a disposed above the grip 1c, a changing dial 1e disposed in a back of the release button 1a, a dial with lock 3 of a dial device A adjacent to the changing dial 1e, a lock button 6 disposed in a center of the dial with lock 3, a finder hood if disposed above a camera back, and an image pickup section (an image pickup device) 1g located inside the camera and disposed on a center axis of the body mount 1b.

The dial with lock 3 of the dial device A is rotatable around an axis X, which is a dial rotation axis. In the following explanation, a circumferential direction around the axis X is referred to as Z direction. That is, the dial with lock 3 is rotatable in both directions in a Z direction centering on the axis X. In the following explanation, the axis X is also represented as a rotation axis, a rotation center axis, and a center axis.

Figure 2:
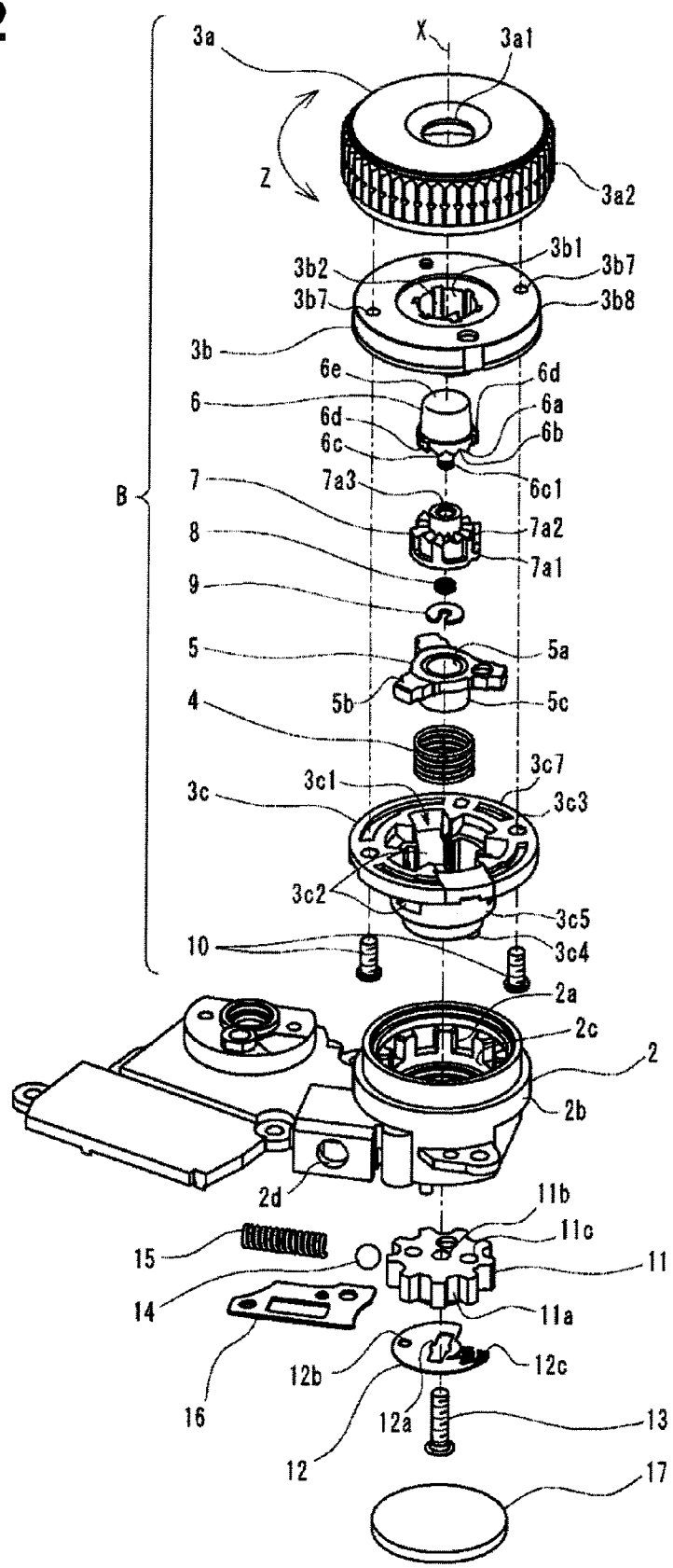
FIG. 2 is an exploded perspective view of the dial device.
Figure 3:
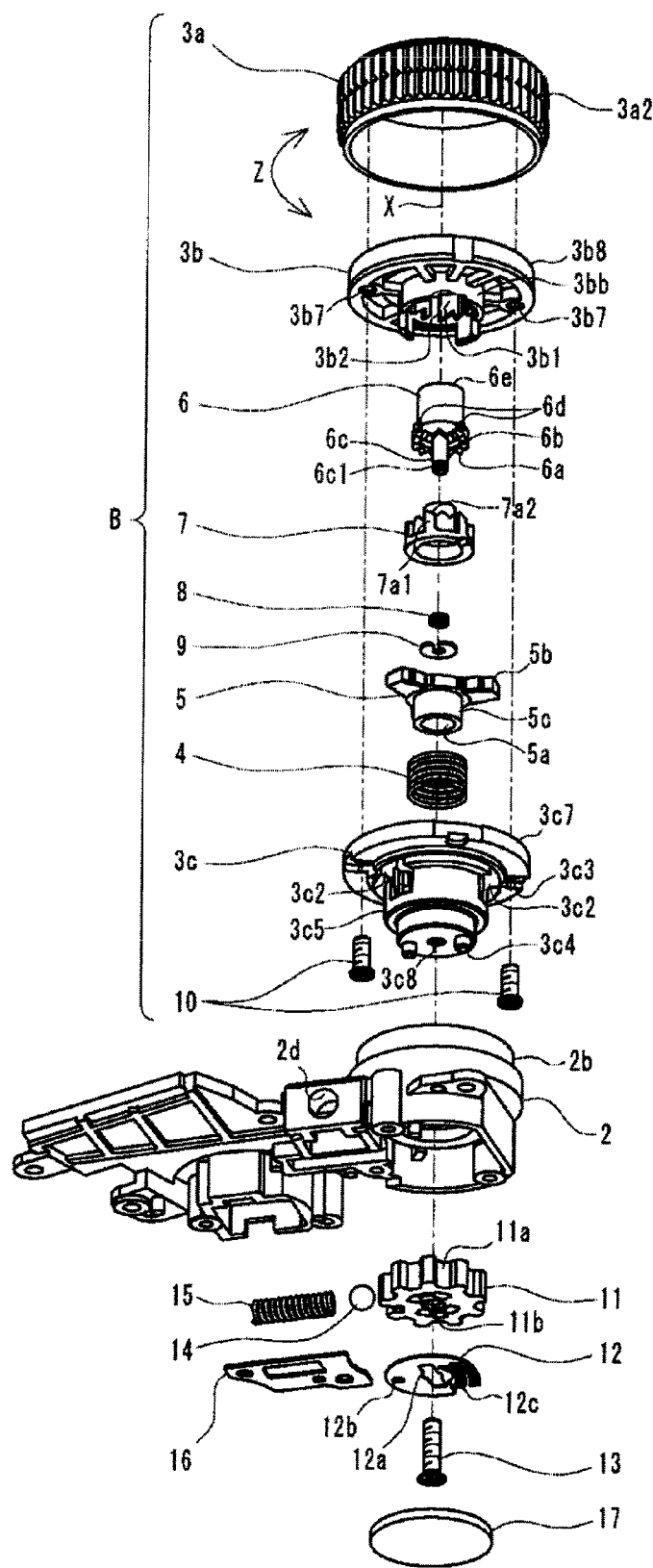
FIG. 3 is an exploded perspective view of the dial device.
Figure 4:
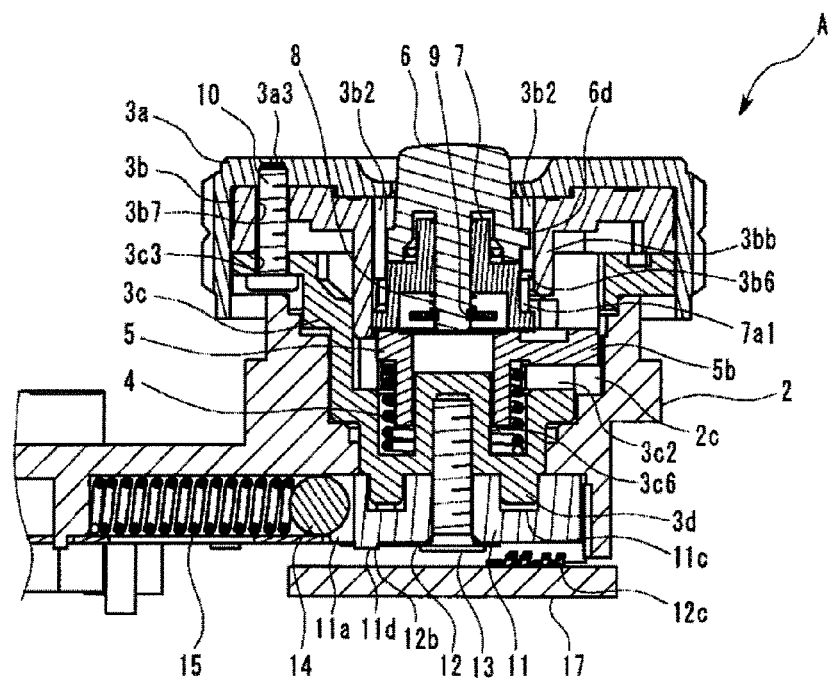
FIG. 4 is a sectional view of the dial device at time when a lock button is present in a second position on a dial rotation axis.
Figure 5:
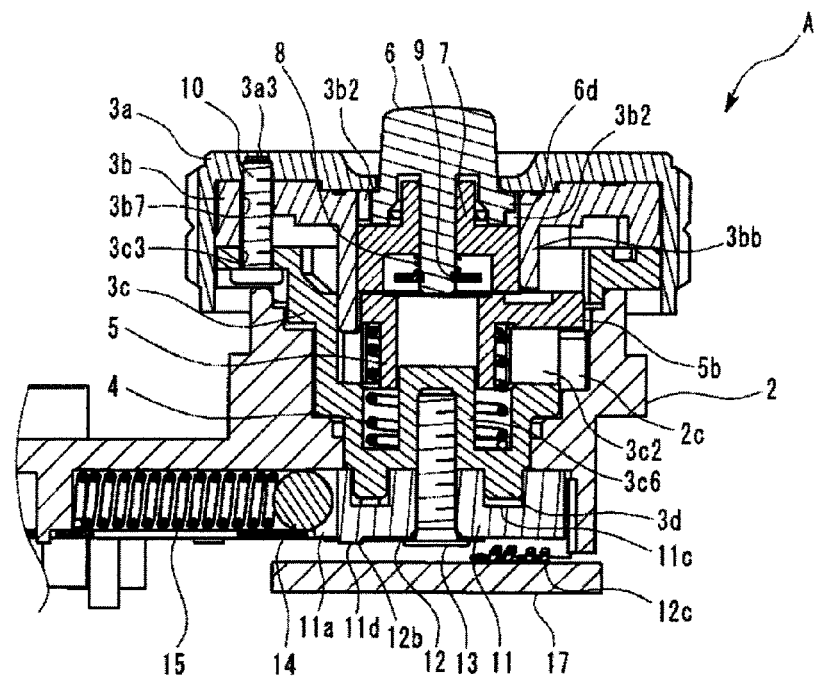
FIG. 5 is a sectional view of the dial device at time when the lock button is present in a first position on the dial rotation axis.

FIG. 2 and FIG. 3 are exploded perspective view of the dial device A of the present invention. Note that, in the following explanation, for convenience, a direction from a bottom to a top of the camera 1 along the axis X (a direction from down to up along the axis X in FIG. 2 and FIG. 3) is referred to as upward and a direction from the top to the bottom of the camera 1 (a direction from up to down along the axis X in FIG. 2 and FIG. 3) is referred to as downward. Naturally, an up-down direction used in the following explanation does not limit a posture of the dial device A in a case in which the dial device A is used. That is, a direction referred to up in the following explanation does not need to be upward and may be downward or sideward when the dial device A is actually used.

The dial device A in the present embodiment is mainly configured by a dial exterior operation member 3a, a lock control member 3b, a dial shaft member 3c, the lock button 6, a follower 7, an integration spring 8, a stop ring 9, a lock member 5, an urging spring 4, a base 2, a positioning plate 11, a ball member 14, and a positioning spring 15.

The dial exterior operation member 3a is a member configuring dial means and is formed in a cylindrical shape closed on one end side, which is an upper side, opened on the other end side, which is a lower side, and having small length compared with a diameter. The dial exterior operation member 3a is rotatable around the axis X. In the dial exterior operation member 3a, a button hole 3a1, which is a substantially circular pierce-through hole, substantially centering on the axis X is provided. A lock button explained below is inserted through the button hole 3a1. An exterior roulette 3a2 is applied to an outer circumferential surface of the dial exterior operation member 3a.

Figure 6:
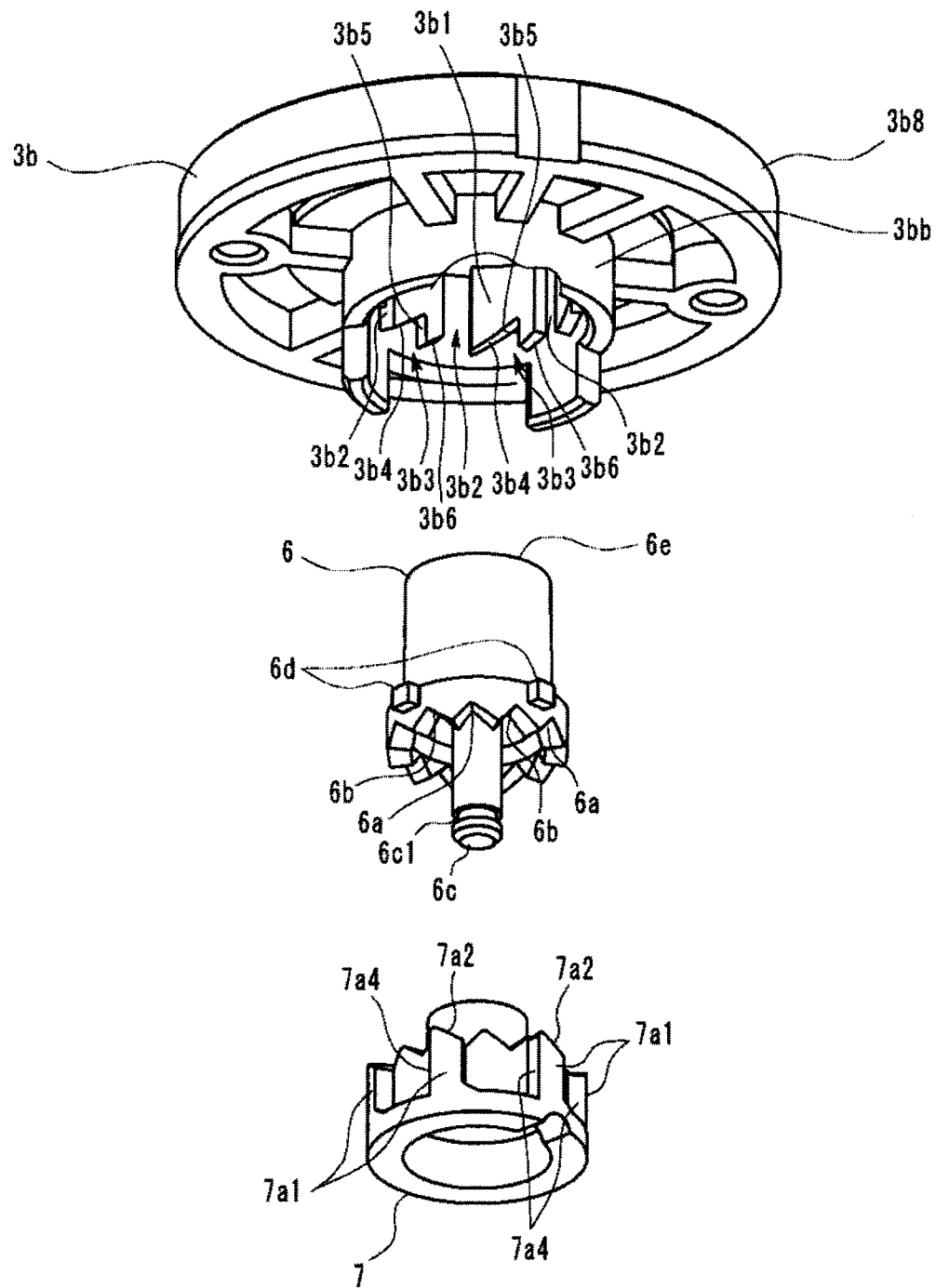
FIG. 6 is an enlarged view of a lock control member, the lock button, and a follower.

On an inside of the dial exterior operation member 3a, the lock control member 3b incorporated in and integrated with the dial exterior operation member 3a and rotatable around the axis X is disposed. The lock control member 3b is a member configuring the dial means. In the lock control member 3b, a disk section 3b8, a substantially circular opening hole 3b1 provided in a center of the disk section 3b8, and a cylinder section 3bb surrounding the opening hole 3b1 are formed. On an inner circumferential surface of the cylinder section 3bb of the lock control member 3b, as shown in FIG. 6, there are provided unlock grooves (linear guide grooves) 3b2 which are a plurality of groove sections, equally separated from one another in a circumferential direction and substantially parallel to the center axis (the axis X) of the opening hole 3b1, and lock maintaining recessed sections 3b3, which are recessed sections provided among the unlock grooves 3b2 disposed along the circumferential direction and are recessed in parallel to the rotation axis in a direction from a second position to a first position explained below. That is, the unlock grooves 3b2 and the lock maintaining recessed sections 3b3 are alternately disposed in the circumferential direction. In the present embodiment, as an example, six unlock grooves 3b2 and six lock maintaining recessed sections 3b3 are provided.

Note that the unlock groove 3b2 is a space having a fixed width in the circumferential direction sandwiched by a pair of walls having fixed thickness in a radial direction. The unlock groove 3b2 also functions as a linear guide groove explained below. In the present embodiment, all the six unlock grooves 3b2 have functional action for unlocking for enabling dial rotation. Among the six unlock grooves 3b2, three unlock grooves 3b2 have a function of linear grooves for guiding the lock button 6 explained below in the axial direction.

The lock maintaining recessed sections 3b3 are a plurality of recessed sections having a thickness in the radial direction and being recessed in a disk section direction in a direction parallel to the center axis of the opening hole 3b1. Between the unlock grooves 3b2 in the circumferential direction, in order of a direction in which a cam follower 7a1 explained below moves from one unlock groove 3b2 to the immediately neighboring unlock groove 3b2, the lock maintaining recessed section 3b3 and an unlock shift slope 3b6, which is a guide slope, are disposed side by side.

The lock maintaining recessed section 3b3 includes a lock maintaining slope 3b4, which is a slope functioning as a so-called cam surface, extending between a mouth of the unlock groove 3b2 and another unlock groove 3b2 in a direction in which the cam follower 7a1 explained below moves ahead and having a normal vector having a component in an opposite direction of a depth direction of the unlock grooves 3b2 and a component in the circumferential direction, which is the direction in which the cam follower 7a1 moves ahead, and a lock maintaining wall surface 3b5, which is a plane standing in parallel to the unlock grooves 3b2 from an end apart from the mouth of the lock maintaining slope 3b4.

Further, the unlock shift slope 3b6, which is a slope functioning as a so-called cam surface, communicating from an end of the lock maintaining wall surface 3b5, which is a mouth of the lock maintaining recessed section 3b3, to a mouth of another unlock groove and parallel to the lock maintaining slope 3b4 is formed and disposed. Therefore, in order of rotation and movement of the follower 7 explained below, the unlock grooves 3b2, the lock maintaining slopes 3b4, the lock maintaining wall surfaces 3b5, and the unlock shift slopes 3b6 are cyclically formed in the circumferential direction in the lock control member 3b. In the present embodiment, six unlock grooves 3b2, six lock maintaining recessed sections 3b3, and six unlock shift slopes 3b6 are provided. The width in the circumferential direction of the unlock shift slope 3b6 is set to a width from halfway on a cam surface 6a1, which is a slope explained below, to halfway on an escape surface 6a2, which is a slope, in the circumferential direction. Width in the circumferential direction of the lock maintaining slope 3b4 is set to 30° in a circumferential angle from halfway on the cam surface 6a1 in the circumferential direction. Therefore, slope length in the circumferential direction of the lock maintaining slope 3b4 is larger than slope length in the circumferential direction of the unlock shift slope 3b6.

The dial shaft member 3c configuring the dial means together with the lock control member 3b is firmly fixed to the dial exterior operation member 3a. The dial shaft member 3c includes a shaft section 3c5 functioning as a rotating shaft, a disk section 3c7 for firmly fixing the dial shaft member 3c to the dial exterior operation member 3a, and a center opening recessed section 3c1, which is also a housing part for housing other members explained below on insides of the shaft section 3c5 and the disk section 3c7. In a center portion of a bottom portion of the center opening recessed section 3c1, a substantially cylindrical center shaft section 3c6 fits by loosely fitted with the lock member 5 explained below is provided to project upward. In the center opening recessed section 3c1, the lock member 5 fits with the center shaft section 3c6 and is slidable in the axial direction. A screw lower hole 3c8 for screwing a screw 13 is provided from an outer end face in the center shaft section 3c6.

In the disk section 3c7, screw pierce-through holes 3c3 for fixing the dial shaft member 3c and the dial exterior operation member 3a using screws 10 are provided. Three openings 3c2 equally disposed in the circumferential direction around a center axis of the shaft section 3c5 are provided in the dial shaft member 3c. The opening 3c2 is formed in a groove shape parallel to a center axis. The opening 3c2 has a groove-like opening, one end portion, which is an upper part, of which is opened in the axial direction in a portion of the disk section 3c7 and the other end portion, which is a lower part, of which is closed in the axial direction in the shaft section 3c5 but is pierced through an outer diameter and opened in the radial direction. Further, a lower side end portion of the shaft section 3c5 includes positioning projecting sections 3c4, which are a pair of projecting sections having a convex shape in the axial direction, for determining a relative position with the positioning plate 11 explained below.

The dial exterior operation member 3a, the lock control member 3b, and the dial shaft member 3c, which is a rotary member, configure an assembly B, which is integrally assembled. On an inside of the assembly B, the lock button 6, the follower 7, the integration spring 8, the stop ring 9, the lock member 5, and the urging spring 4 are incorporated.

The lock button 6 is a push button that is formed in a substantially columnar shape, receives pressing operation by the operator, moves up and down along the rotation axis X of the dial device, and a coaxially arranged with the dial exterior operation member 3a, the lock control member 3b, and the dial shaft member 3c, which is the rotary member. A pressed surface 6e is provided on an upper end face of the lock button 6, which is a pressed member. On a lower end face opposite to the pressed surface 6e, cam surfaces arranged in the circumferential direction around the axis X, having a *chrysanthemum* shape that repeats concavities and convexities in the axial direction, having width in the radial direction, and having length and a tilt in the circumferential direction are provided. Therefore, the cam surfaces are radially formed from a column center axis. Further, the cam surfaces include two kinds of cam surfaces. One is a first cam slope 6b1, which is a cam surface also considered a lock driving surface for rotating the follower 7 explained below, moving a follower surface 7a2 explained below from the unlock groove 3b2 to the lock maintaining slope 3b4, and shifting the follower surface 7a2 to the lock maintaining recessed section 3b3. The other is a second cam slope 6a1, which is a cam surface also considered an unlock driving surface for rotating the follower 7 and shifting the follower surface 7a2 explained below from the lock maintaining recessed section 3b3 to the unlock groove 3b2.

The cam surfaces 6a1 form pairs with escape surfaces 6a2 to form six unlock recessed sections 6a recessed in the pressed surface 6e direction (upward) and form pairs with escape surfaces 6b2 to form six lock recessed sections 6b recessed in the pressed surface 6e direction (upward). The unlock recessed sections 6a and the lock recessed sections 6b are alternately arranged at an equal interval in the circumferential direction around the rotation axis and formed at a lower end of the lock button 6. That is, in the present embodiment, six cam surfaces 6a1, six escape surfaces 6a2, six cam surfaces 6b1, and six escape surfaces 6b2 are formed in the circumferential direction and at the same width. When viewed toward the rotation center of the dial device from the outer circumference, the cam surfaces 6a1 and the cam surfaces 6b1 have the same inclination. The cam surfaces 6a1 and the cam surfaces 6b1 are slopes having inclination same as inclination of the lock maintaining slopes 3b4 and the unlock shift slopes 3b6. The escape surfaces 6b2 has a shape for only connecting the cam surfaces 6a1 and the cam surfaces 6b1 and do not perform any action. The escape surfaces 6a2 are formed in a slope shape that connects the cam surfaces 6a1 and the cam surfaces 6b1 but are pressed by distal ends of the follower surfaces 7a2 as explained below and do not prevent movement of the follower 7.

A shaft-like lock button shaft 6c smaller in diameter than the column section extends from a center of an end face, which is a cam surface provided on a lower end face of the column section of the lock button 6. A circumferential groove 6c1 is provided in a vicinity of an end portion of the lock button shaft 6c.

On an outer circumference of an end portion close to the cam surface of the column section of the lock button 6, projecting sections 6d projecting in the radial direction disposed equally apart from one another in the circumferential direction are provided in three places. In a state in which the lock button 6 slidably fits in the opening hole 3b1 of the lock control member 3b, the projecting sections 6d are located in the unlock grooves (the linear guide grooves) 3b2. The projecting sections 6d are slidable along the unlock grooves 3b2. Rotation around the axis X of the lock button 6 relative to the lock control member 3b is restricted (prohibited) by the fitting of the projecting sections 6d and the unlock grooves 3b2. The width of the projecting section 6d is the width from halfway on the cam surface 6b1 to halfway on the escape surface 6a2 in a position in the circumferential direction. The width is approximately 15° as a circumference angle. Therefore, the width of the unlock groove (the linear guide groove) 3b2 is set slightly larger than the width of the projecting section 6d.

The follower 7 is a substantially columnar member. A pierce-through hole 7a3 (a column center hole) in which the lock button shaft 6c of the lock button 6 fits and slides is provided in a column center of the follower 7. A plurality of cam followers 7a1 equally separated from one another in the circumferential direction and projecting in the radial direction are provided on an outer circumferential surface of the follower 7. In the present embodiment, six cam followers 7a1 are formed. The cam followers 7a1 are formed at a width slightly smaller than 15° in a circumference angle in the circumferential direction in an elongated key shape extending in parallel to the axis X. The respective cam followers 7a1 of this key shape portion fit in the respective plurality of unlock grooves 3b2 in order and slide. The follower surfaces 7a2, which are slopes opposed to the cam surfaces of the lock button 6, are formed on one end faces of the cam followers 7a1 having the key shape. The follower surfaces 7a2 are slopes having width in the radial direction that can simultaneously come into contact with the cam surfaces of the lock button 6 and the lock maintaining slopes 3b4 of the lock maintaining recessed section 3b3 of the lock control member 3b and can simultaneously come into contact with the cam surfaces of the lock button 6 and the unlock shift slopes 3b6 of the lock control member 3b. Note that the follower surfaces 7a2 are plane slopes in the present embodiment. However, the follower surfaces 7a2 do not always need to be the planes and may be curved surfaces like a part of a cylinder circumferential surface.

The cam followers 7a1 having the key shape have width in the circumferential direction, fit in the unlock grooves, that is, the liner guide grooves 3b2 of the lock control member 3b, and are slidable in the axis X direction.

Note that each of the follower surfaces 7a2, the lock maintaining slopes 3b4, the unlock shift slopes 3b6, and the cam surfaces 6a1 and the cam surfaces 6b1 of the lock button 6 may be either a simple plane, curved surface, or the like or may be a curved surface, which is a part of a spiral shape. In the present embodiment, when viewed toward the center axis X from an outward direction, each of the follower surfaces 7a2, the lock maintaining slopes 3b4, the unlock shift slopes 3b6, and the cam surfaces 6a1 and the cam surfaces 6b1 of the lock button 6 is formed to be a slope having the same tilt.

The integration spring 8 is a coil spring functioning as an urging member for urging the cam surfaces of the lock button 6 and the follower surfaces 7a2 of the follower 7 to be always in contact with each other. The lock button shaft 6c fits in an inner diameter of the integration spring 8.

The stop ring 9 is made of a disk material having an inner diameter for fitting in the circumferential groove 6c1 of the lock button shaft 6c such that the integration spring 8 does not come off the lock button shaft 6c and an outer diameter larger than an outer diameter of the integration spring 8.

The lock member (a moving and engaging member) 5 includes a barrel section 5c that fits in the center cylinder section 3c6 of the dial shaft member 3c. A center opening hole 5a piercing through in the axial direction is provided in a center of the barrel section 5c. Three lock arms 5b equally separated from one another in the circumferential direction and projecting outward in the radial direction are provided in the vicinity on one end side (an upward side end portion) of the barrel section 5c. A width dimension in the circumferential direction of the lock arm 5b is set such that the lock arm 5b fits in groove width of the opening 3c2 of the dial shaft member 3c and enables the lock arm 5b to move in a direction parallel to the center axis (the axis X) of the dial shaft member 3c in the opening 3c2 in association with axial direction movement of the lock button 6. The lock arm 5b fit in the opening 3c2 and is always guided in the direction parallel to the center axis in the groove width of the opening 3c2.

The urging spring 4, which is an elastic member, is a coil spring housed in the center opening recessed section of the dial shaft member 3c and for always urging the lock member 5 to come into contact with the follower 7 in the axis X direction. Further, the urging spring 4 urges the lock member 5, which is the moving and engaging member, in a direction from the second position to the first position of the lock button 6, which is the pressed member, and urges the lock button 6, which is the pressed member, in a direction from the second position to the first position via the lock member 5, which is the moving and engaging member, and the follower 7.

The base 2, which is a fixed member, includes a bearing section 2b that houses the dial assembly B and relatively rotatably supports the dial assembly B and a click-spring housing section 2d that houses the positioning spring 15 and the ball member 14 that perform click urging for the positioning plate 11 explained below. The positioning spring 15 and the ball member 14 housed on an inside of the click-spring housing section 2d are held by a pressing plate 16 not to project from the click-spring housing section 2d. The ball member 14 engages in positioning recessed sections 11a of the positioning plate 11 explained below with an urging force of the positioning spring 15.

The bearing section 2b has a center opening 2c, which is a circular pierce-through port, in a center. On an inner surface of the center opening 2c, a part functioning as a bearing for rotatably supporting the dial assembly B is formed. On the inner surface of the center opening 2c, a plurality of lock grooves (fixed side engaging sections) 2a for enabling prohibition of rotation of the dial assembly B at each predetermined angle are disposed to be equally separated from one another in the circumferential direction in nine places in the present embodiment. The lock groove 2a is a groove having a fixed width dimension in the circumferential direction and substantially parallel to the rotation center axis (the axis X) of the dial assembly B and has depth in the rotation center axis direction and the radial direction. The width dimension of the lock groove 2a is slightly larger than a width dimension of the lock arm 5b. According to movement of the lock member 5 parallel to the axis X, the lock arm 5b can take a state in which the lock arm 5b fits in the lock groove 2a (an engaged state) and a state in which the lock arm 5b does not fit in the lock groove 2a (a disengaged state).

The positioning plate 11 is a substantially disk-shaped member. The positioning plate 11 includes a plurality of positioning recessed sections 11a, which are recessed sections engaging with the ball member 14, recessed in the radial direction, and equally arrayed in the circumferential direction, provided on an outer circumference in nine places in the present embodiment, a pierce-through hole 11b provided in a center, and a pair of positioning holes 11c recessed in a direction parallel to the rotation center axis of the dial assembly in order to fit with the pair of positioning projecting sections 3c4 of the dial shaft member 3c and aligning in a relative position to the dial shaft member 3c. The positioning plate 11 is fixed to the dial shaft member 3c. When the positioning plate 11 is fixed to the dial shaft member 3c, the positioning recessed sections 11a and the lock grooves 2a are present in the same positions in positions on the circumference. When the positioning recessed section 11a and the ball member 14 engage, the lock arms 5b of the lock member 5 housed in the dial shaft member 3c are always in positions opposed to the lock grooves 2a.

A contact plate 12 includes a plurality of sliding contact sections 12c that slide on a contact pattern of an electric substrate 17 explained below, a center open hole 12a provided in a center of the plate, and a positioning hole 12b provided in a vicinity of an outer circumference. The positioning hole 12b engages with a positioning projecting section 11d projecting to a lower surface of the positioning plate 11, whereby relative positioning around the axis X of the contact plate 12 and the positioning plate 11 is performed.

A not-shown plurality of contact patterns on which a sliding contact piece of the contact plate 12 is slid to output a necessary electric signal are provided on a surface of the electric substrate 17. The electric substrate 17 is disposed in a position fixed with respect to the base 2. That is, a combination of the electric substrate 17 and the contact plate 12 is a member for realizing an encoder function for detecting an absolute position around the axis X of the dial exterior operation member 3a.

Next, assembling of the dial device A having the configuration explained above is explained.

As explained above, the dial assembly B is configured by the dial exterior operation member 3a, the lock control member 3b, and the dial shaft member 3c. Besides, the dial assembly B is configured by the lock button 6, the follower 7, the integration spring 8, the stop ring 9, the lock member 5, the urging spring 4, and the screws 10.

First, the lock button 6 and the follower 7 are combined and integrated. The lock button shaft 6c of the lock button 6 is pierced through the pierce-through hole 7a3 of the follower 7 to oppose the cam surfaces 6a1 and 6b1 of the lock button 6 and the follower surfaces 7a2 of the follower 7 each other. Thereafter, the integration spring 8 is inserted over the lock button shaft 6c. The inner diameter of the stop ring 9 is fit in the circumferential groove 6c1 of the lock button shaft 6c to prevent the integration spring 8 from coming off the lock button shaft 6c. In this state, the lock button 6 and the follower 7 are relatively movable in the axis X direction. In a static state in which external force is not applied, the cam surfaces 6a1 and 6b1 and the follower surfaces 7a2 are always in contact with each other by an urging force of the integration spring 8 (see FIG. 4 and FIG. 5). The cam surfaces 6a1 and 6b1 and the follower surfaces 7a2 relatively move with the urging force of the integration spring 8 and external force in the axial direction to be capable of coming into contact with and separating from each other. In the state in which the cam surfaces 6a1 and 6b1 and the follower surfaces 7a2 are in contact, if torque around the axis serving as the external force is applied, the lock button 6 and the follower 7 are capable of relatively rotating while the follower surfaces 7a2 climb over the cam surfaces 6a1 and 6b1.

Subsequently, the lock control member 3b is disposed on an inside of the dial exterior operation member 3a. At this point, the disk section 3b8 of the lock control member 3b is placed on an inner end face of the dial exterior operation member 3a, arranged such that the cylinder section 3bb of the lock control member 3b projects from an open end of the dial exterior operation member 3a, and provisionally integrated.

Relative positions of the dial exterior operation member 3a and the lock control member 3b are not a problem in particular. However, if necessary, projecting sections and recessed sections may be provided in the dial exterior operation member 3a and the lock control member 3b and fit with each other to position the dial exterior operation member 3a and the lock control member 3b.

Thereafter, the lock button 6 and the follower 7 integrated with each other are fit in the cylinder section of the lock control member 3b. At this point, the pressed surface 6e of the lock button 6 is exposed from the button hole of the dial exterior operation member 3a. The projecting sections 6d of the lock button 6 are fit in the unlock grooves 3b2 in the cylinder section 3bb of the lock control member 3b. Consequently, the lock button 6 and the follower 7 integrated with each other become relatively movable in the axis X direction with respect to the lock control member 3b in the cylinder section of the lock control member 3b. Relative rotation around the axis X is prohibited by the fitting of the projecting sections 6d of the lock button 6 and the unlock grooves 3b2. At this point, the cam followers 7a1 of the follower 7 may be fit in or may not be fit in the unlock grooves 3b2.

Subsequently, the urging spring 4 is placed to be fit in the center shaft section 3c6 of the center opening recessed section 3c1 of the dial shaft member 3c. Further, the center opening 5a of the lock member 5 and the center shaft section 3c6 are fit to bend the urging spring 4 in the axial direction while an outer diameter of the barrel section 5c of the lock member 5 is fit in an inner diameter of the urging spring 4. At this point, the lock arms 5b of the lock member 5 are incorporated to fit in lock openings 3c2 provided in the center opening recessed section 3c1 of the dial shaft member 3c. In this state, the relative rotation of the lock member 5 and the dial shaft member 3c is impossible but the relative movement in the axis X direction is possible.

Thereafter, while the lock member 5 is pressed not to come off the dial shaft member 3c, the disk section 3c7 side of the dial shaft member 3c, in which the urging spring 4 and the lock member 5 are housed, and the lock control member 3b provisionally integrated with the dial exterior operation member 3a, in which the lock button 6 and the follower 7 integrated with each other are housed, are placed one on top of the other in the rotation axis direction such that the lock member 5 and the follower 7 are opposed to each other. The screws 10 are pierced through the screw pierce-through holes 3c3 provided in the disk section 3c7 of the dial shaft member 3c and screw pierce-through holes 3b7 provided in the disk section 3b8 of the lock control member 3b and screwed and fixed in a screw lower hole 3a3 (shown in FIG. 4 and FIG. 5) provided on an inner side of one end face of the exterior dial member 3a. Consequently, the dial assembly B is completed.

Thereafter, the shaft section 3c5 of the dial shaft member 3c of the dial assembly B is inserted into and fit in the bearing section 2b of the base 2. The pair of positioning projecting sections 3c4 of the shaft section end face of the dial shaft member 3c are inserted through the center opening 2c of the base 2 and fit in the positioning holes 11c of the positioning plate 11 to align relative positions in the circumferential direction of the dial shaft member 3c and the positioning plate 11. Further, the long hole 12a of the contact plate 12 and a screw lower hole present in a center of the dial shaft member 3c are aligned, the positioning projecting section 11d of the positioning plate 11 and the positioning hole 12b of the contact plate 12 are further fit with each other, and the screw 13 is pierced through from the contact plate 12 side toward the pierce-through hole 11b of the positioning plate 11 and screwed in the lower hole 3c8 of the center shaft section 3c6 of the dial shaft member 3c to fix the positioning plate 11 to the dial shaft member 3c.

Thereafter, the ball member 14 is housed in the click-spring housing section 2d first, the positioning spring 15 is housed next, the ball member 14 is brought into contact with the positioning recessed section 11a by an urging force of the positioning spring 15, and the pressing plate 16 is attached to the base 2. Consequently, the dial device A is completed. If the dial assembly B is rotatable with respect to the base 2 as explained below, when the dial assembly B, that is, the dial exterior operation member 3a is rotated by action of the ball member and the positioning plate, the dial device A rotates while giving a click feeling every time the dial exterior operation member 3a is rotated. The dial device A is assembled to, for example, the camera 1 in which the dial device A should be used. Prior to the assembling, the electric substrate 17 is assembled to an inside of the camera 1. If the dial device is attached to the camera 1, it is possible to encode operation added to dial operation and output a necessary electric signal to a control device inside the camera 1.

Figure 7:
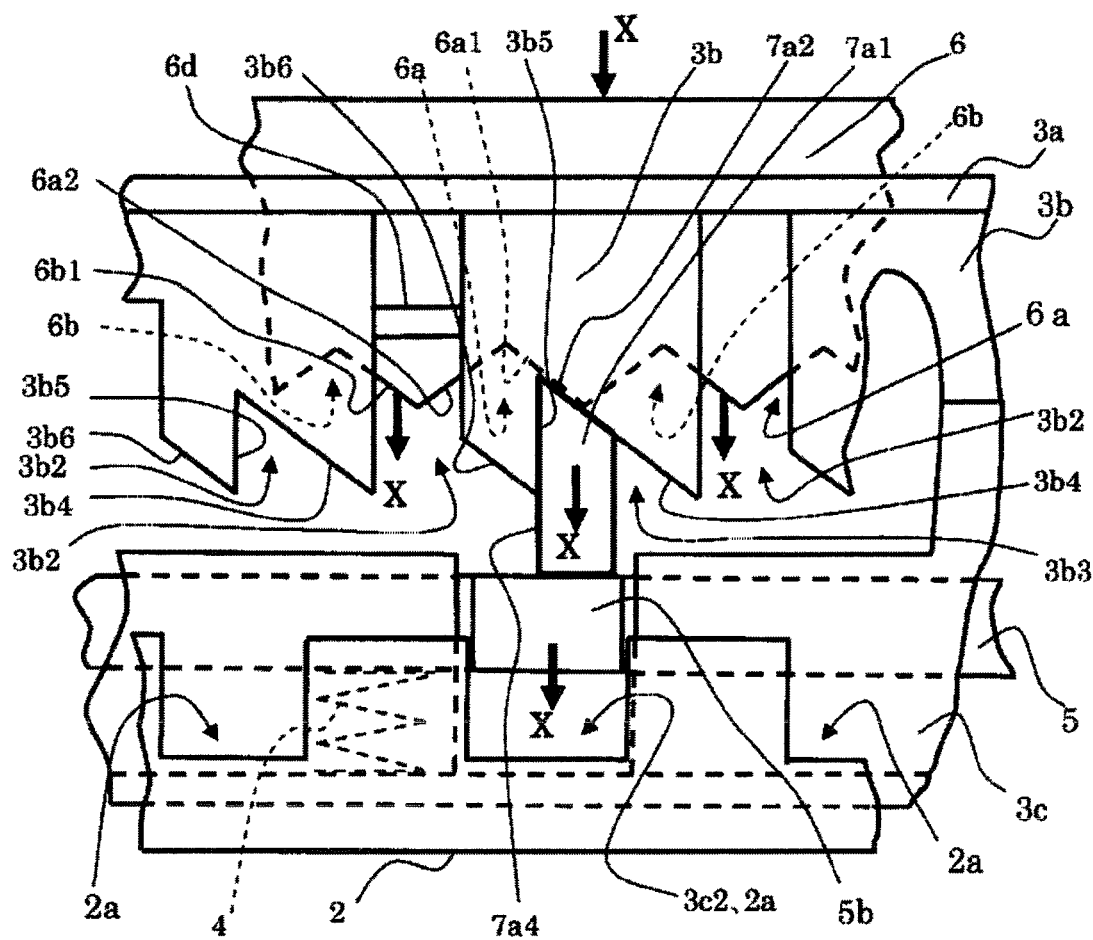
FIG. 7 is a schematic view for explaining an operation principle of the dial device.
Figure 8:
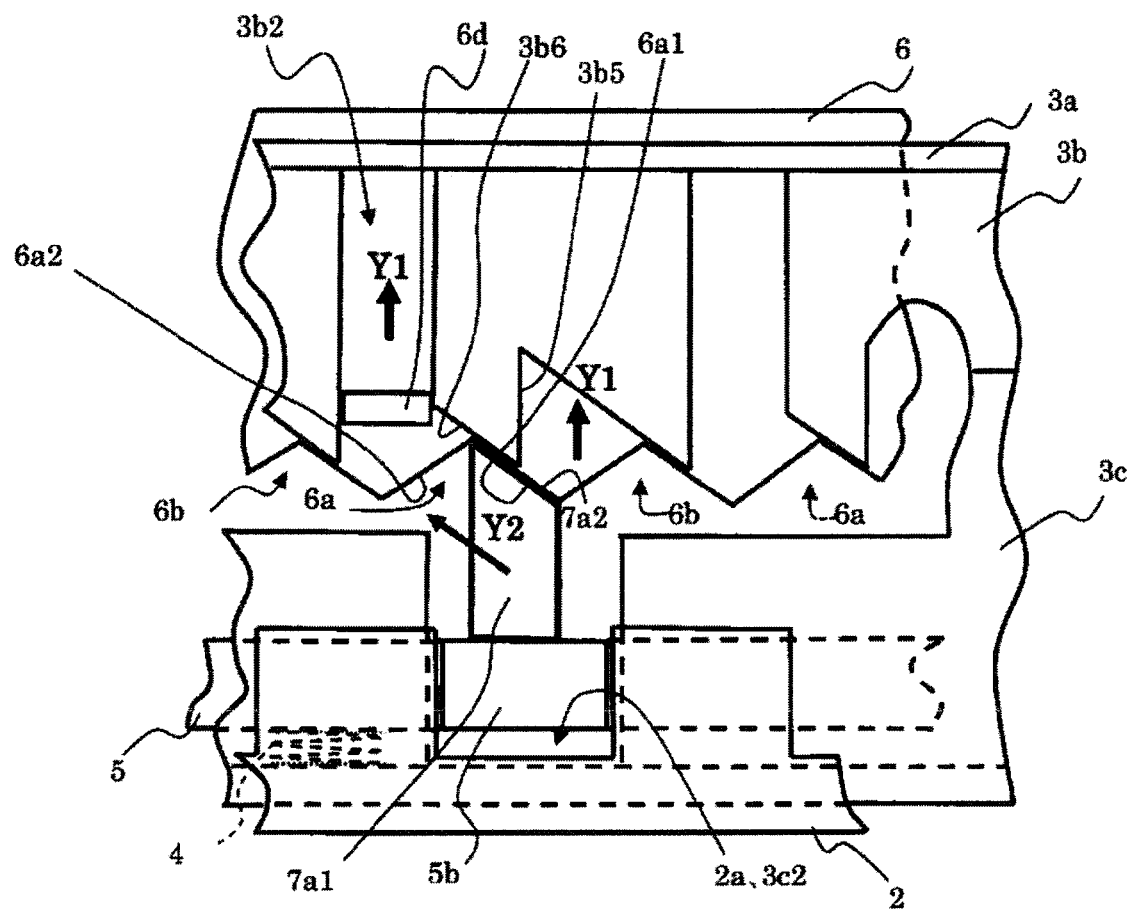
FIG. 8 is a schematic view for explaining the operation principle of the dial device.
Figure 9:
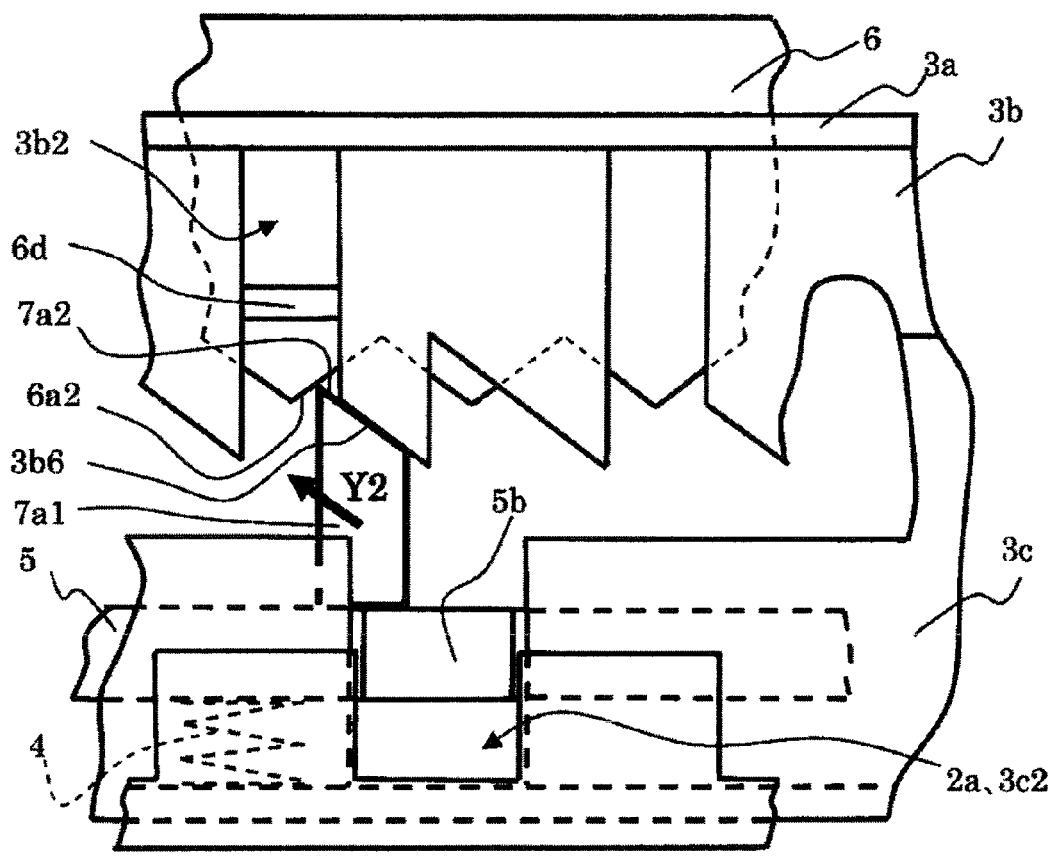
FIG. 9 is a schematic view for explaining the operation principle of the dial device.
Figure 10:
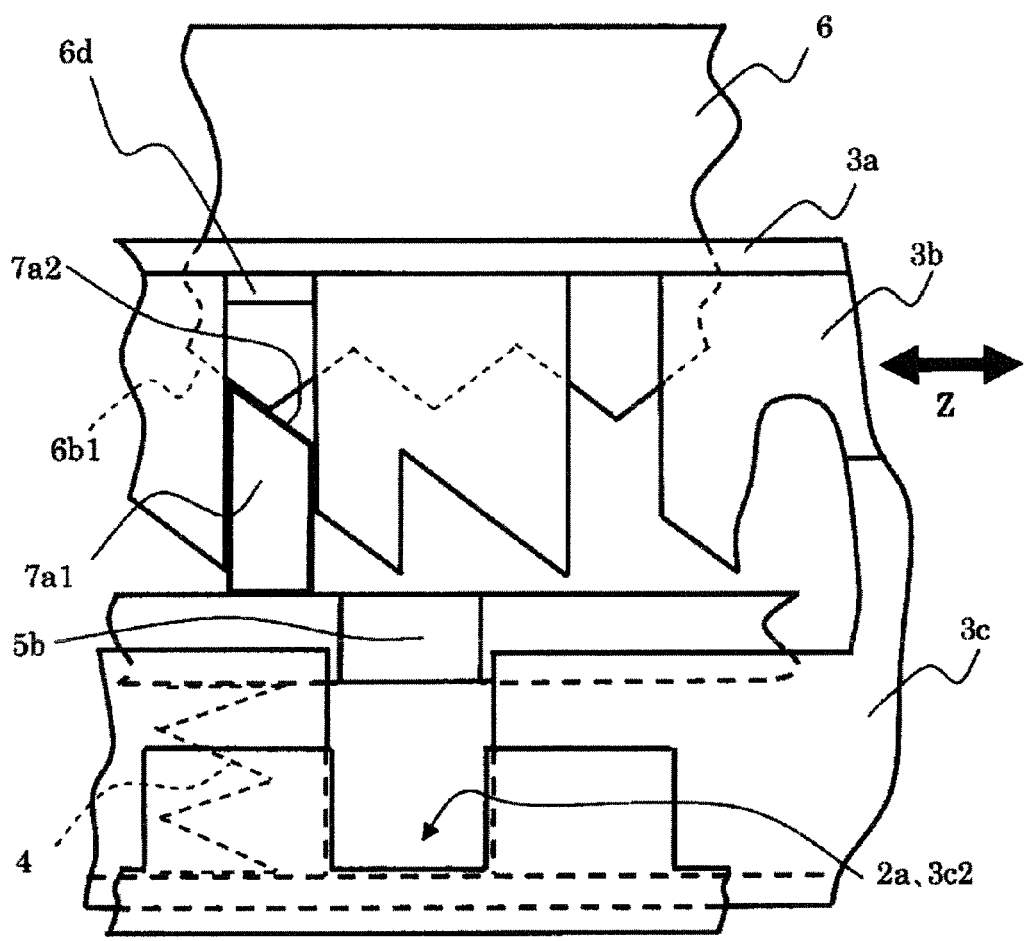
FIG. 10 is a schematic view for explaining the operation principle of the dial device.

Next, action of the present invention is explained with reference to FIG. 7 to FIG. 10. FIG. 7 is a diagram for explaining a process in which the lock button transitions from the second position to the first position. FIG. 8 is a diagram for explaining a process in which the lock button transitions from the second position to the first position following a state shown in FIG. 7. FIG. 9 is a diagram for explaining a process in which the lock button transitions from the second position to the first position following a state shown in FIG. 8. FIG. 10 is a diagram for explaining a state in which the transition of the lock button from the second position to the first position is completed.

Note that FIG. 7 to FIG. 10 are schematic diagrams for clearly showing a principle. There are portions different from the actual configuration shown in FIG. 2 to FIG. 5. In the actual configuration shown in FIG. 2 to FIG. 5, a part of the members perform rotational motions. However, FIG. 7 to FIG. 10 are developed on a plane. The rotational motions of the members are replaced with movement in the left-right direction in the figures. The dial exterior operation member 3*a*, the lock control member 3*b*, and the dial shaft member 3*c* configuring the dial assembly B are integrated by the screws 10. However, in FIG. 7 to FIG. 10, the dial exterior operation member 3*a*, the lock control member 3*b*, and the dial shaft member 3*c* are omitted. In FIG. 7 to FIG. 10, the cam followers 7*a*1 are limitlessly movable in the left-right direction (actually, a rotating direction around the axis X).

When the assembling of the dial device A is completed, unless special attention is paid, it is unknown whether the dial device is in a lock state, that is, a state in which the dial exterior operation member 3*a* is unable to rotate relatively to the base 2 (a rotation prohibited state) or is in an unlock state, that is, a state in which the dial exterior operation member 3*a* is enable to rotate relatively to the base 2 (a rotation possible state or a rotation permitted state). The state of the dial device A depends on a method of assembling as explained below.

When the disk device A is in the lock state when the assembling is completed, the dial device A needs to be assembled in a state in which the follower surfaces 7*a*2 of the follower 7 are in contact with the lock maintaining slopes 3*b*4. When the disk device A is in the unlock state when the assembling is completed, the cam followers 7*a*1 of the follower 7 fit in the linear guide grooves 3*b*2 and the follower surfaces 7*a*2 need to be present in the liner guide grooves 3*b*2 (the unlock grooves).

In explaining the embodiment of the present invention, a state in which the assembling is completed, that is, an initial state is a lock state in which the lock button 6 is present in the second position on the axis in the rotation center axis direction of the dial means, that is, the lock state shown in FIG. 7. In this state, the dial exterior operation member 3*a* is unable to rotate relatively to the base 2 (a rotation prohibited state).

A transition from the lock state to the unlock state of the lock is explained. In the lock state, the follower surfaces 7*a*2 of the follower 7 are in contact with the lock maintaining slopes 3*b*4. The lock member 5 urged by the urging spring 4 urges the follower 7 and brings the follower surfaces 7*a*2 into contact with the lock maintaining slopes 3*b*4. That is, the cam followers 7*a*1 are held in the recessed sections 3*b*3. Further, outer diameter distal end portions of the lock arms 5*b* of the lock member 5 pierce through the lock openings 3*c*2 of the dial shaft member 3*c* and fit in the lock grooves 2*a*. Therefore, the dial exterior operation member 3*a* integral with the dial shaft member 3*c* cannot rotate. That is, the dial cannot rotate.

To shift the dial device A from the lock state shown in FIG. 7 to the unlock state, the lock button 6 is pressed in a direction of an arrow X in FIG. 7. When the lock button 6 is pressed, the lock button 6 is displaced in a pressing direction. The projecting sections 6*d* of the lock button 6 move in the direction of the arrow X in the linear guide grooves 3*b*2 of the lock control member 3*b*. The unlock driving surfaces 6*a*1 configuring the unlock recessed sections 6*a* of the lock button 6 and the follower surfaces 7*a*2 of the follower 7 are in a contact state. The unlock driving surfaces 6*a*1 press the follower surfaces 7*a*2 in the direction of the arrow X according to the pressing.

Then, the cam followers 7*a*1 of the follower 7 are moved only in the direction of the arrow X along the lock maintaining wall surfaces 3*b*5 configuring the lock maintaining recessed sections 3*b*3 of the lock control member 3*b* in an unrotatable state. According to the movement, the lock arms 5*b* are also moved in the direction of the arrow X resisting the urging force of the urging spring 4. The lock arms 5*b* move in the direction of the arrow X in the lock openings 3*c*2 of the dial shaft member 3*c* and further move in a depth direction of the lock grooves 2*a*.

Then, the three surfaces, i.e., the follower surface 7*a*2, the unlock driving surface 6*a*1, and the unlock shift slope 3*b*6 change to a substantially flush state. Contact of the side wall surfaces 7*a*4 of the cam followers 7*a*1 and the lock maintaining wall surfaces 3*b*5 comes off, the follower surfaces 7*a*2 slid on the unlock driving surface 6*a*1 according to action of the urging force of the urging spring 4, and the follower 7 move in a left direction in the figure. At this point, pressing on the lock button 6 continues. The unlock driving surfaces 6*a*1 are located slightly below the unlock shift slopes 3*b*6. Slight gaps are formed between the unlock shift slopes 3*b*6 and the follower surfaces 7*a*2. The follower surfaces 7*a*2 slide on the unlock driving surfaces 6*a*1. Distal end portions of the follower surfaces 7*a*2 come into contact with the escape surfaces 6*a*2 and movement in the left direction of the follower 7 is temporarily stopped. That is, the dial device A transitions from the state shown in FIG. 7 to the state shown in FIG. 8.

When the pressing force of the pressing on the lock button 6 is released from this state, that is, when a fingertip of the operator is separated from the lock button 6, the follower 7 is urged by the urging force of the urging spring 4 via the lock member 5. The follower surfaces 7*a*2 and the unlock shift slopes 3*b*6 slide in contact with each other and are about to displace the lock button 6 in an arrow Y1 direction shown in FIG. 8. Since the projecting sections 6*d* of the lock button 6 fit in the linear guide grooves 3*b*2, the lock button 6 does not rotate and moves only in the arrow Y1 direction (a button projecting direction). However, the follower surfaces 7*a*2 move relatively to the unlock shift slopes 3*b*6 according to the contact of the follower surfaces 7*a*2 and the unlock shift slopes 3*b*6. The follower 7 is displaced in a direction having a component of an arrow Y2 direction shown in FIG. 7 and FIG. 8 (in FIG. 1 and FIG. 2, a clockwise direction and a camera upward direction of the dial exterior operation member 3*a*). That is, the follower 7 moves in the left direction in FIG. 8 and the button projecting direction. That is, the dial device A transitions to a state shown in FIG. 9.

Slope distal ends of the follower surfaces 7*a*2 and the escape surfaces 6*a*2 come into contact with each other halfway in the transition. A force of the contact presses the lock button 6 in the projecting direction. The follower 7 itself continues to rotate in the left direction in the figure (the arrow Y2). The cam followers 7a1 of the follower 7 rush into the liner guide grooves 3b2. That is, the dial device A transitions to a state shown in FIG. 10. That is, the cam followers 7a1 are pressed by the second cam slopes 6a1, detached from the lock maintaining recessed sections 3b3, given rotation, and guided to the linear guide grooves 3b2. At this point, the lock button 6 is present in the first position in which the lock button 6 projects furthest to the outside more than when the lock button 6 is present in the second position on the axis in the rotation axis direction of the rotary dial means.

The state shown in FIG. 10 is a projected state in which the cam followers 7a1 of the follower 7 is present in the linear guide grooves 3b2 with the urging force of the urging spring 4, the follower surfaces 7a2 are in contact with the lock driving surfaces 6b1, and the lock button 6 is projected to the outside most. The projecting sections 6d of the lock button 6 come into contact with an inner circumferential edge of the button hole 3a1 of the dial exterior operation member 3a to prevent the lock button 6 from coming off to the outside.

The cam followers 7a1 of the follower 7 greatly move forward in the depth direction of the liner guide grooves 3b2. As a result, the lock arms 5b of the lock member 5 urged by the urging spring 4 come off the lock grooves 2a, that is, the dial assembly B including the rotary shaft member 3c integral with the lock member 5 is rotatable with respect to the base 2 and allowed to rotate according to disengagement of the lock arms 5b and the lock grooves 2a. Therefore, the operator can optionally apply rotating operation to the dial exterior operation member 3a in both direction of an arrow Z direction in FIG. 10. Since an encoder function is added to the dial device, the operator can optionally select a target function and the like.

When the lock button 6 is pressed by the fingertip of the operator again from the state shown in FIG. 10, the lock driving surfaces 6b1 of the lock button 6 press the follower surfaces 7a2 resisting the urging force of the urging spring 4. The follower 7 that receives this pressing presses the lock member 5. The lock arms 5b are fit in the lock grooves 2a again. The dial device A changes to the state shown in FIG. 7. The dial assembly B becomes unable to rotate. The dial exterior operation member 3a cannot be rotated. That is, rotation of the dial assembly B including the rotary shaft member 3c is prohibited. As explained above, the follower 7 is caused to perform the rotation and the movement in the axial direction according to the movement to the first position and the second position of the lock button 6, which is the pressed member.

In this way, the dial exterior operation member 3a can repeat the rotatable state and the unrotatable state every time the lock button 6 is pressed and released. Therefore, it is possible to optionally select the both direction rotatable state and the unrotatable state of the dial exterior operation member 3a according to necessity.

Note that, in the present embodiment, the lock button 6, the follower 7, and the lock control member 3b are a so-called double knock mechanism used in a conventional ballpoint pen and the like. However, an invention is provided in which a rotary section is disposed, a refill portion, which is a core material of the ballpoint pen, is regarded as the lock member 5, skillful structures of the lock grooves 2a of the base 2 engaging with the lock member 5 and the dial shaft member 3c are adopted, and a new value is created by a structure different from the conventional double knock mechanism.

Second Embodiment

A second embodiment of the present invention is explained. Note that, in the following explanation, only differences from the first embodiment are explained. Components same as the components in the first embodiment are denoted by the same reference numerals and signs and explanation of the components is omitted as appropriate.

Figure 11:
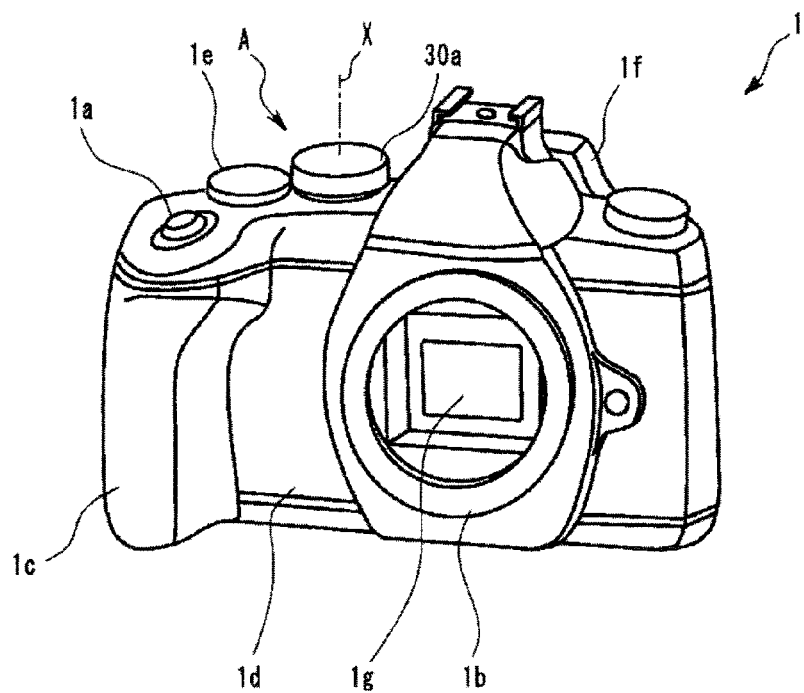
FIG. 11 is an exterior perspective view of an image pickup apparatus mounted with a dial device in a second embodiment.
Figure 12:
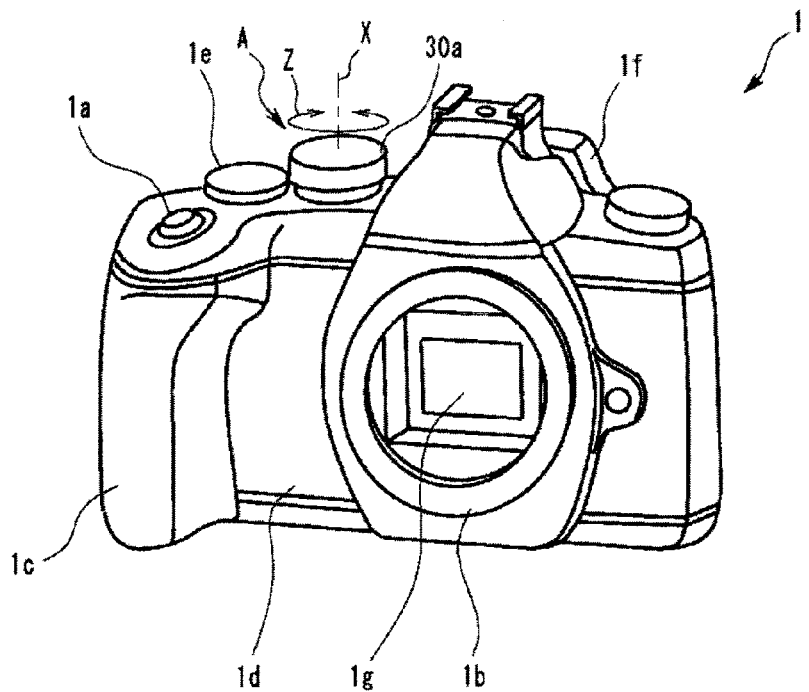
FIG. 12 is an exterior perspective view of the image pickup apparatus mounted with the dial device in the second embodiment.

In the dial device A in the present embodiment, the components in the lock button in the first embodiment are integrally provided in a dial exterior operation member. FIG. 11 shows an exterior perspective view of a camera, which is an image pickup device, in a second position, that is, in a state in which a dial exterior operation member 30a is prohibited from rotating. FIG. 12 shows an exterior perspective view of the camera, which is the image pickup device, in a first position, that is, in a state in which the dial exterior operation member 30a is enabled to rotate.

When the dial exterior operation member 30a is in a first state, the dial exterior operation member 30a is located further above the camera than when the dial exterior operation member 30a is in a second state as shown in FIG. 12 in the axial direction of the rotation axis X.

Figure 13:
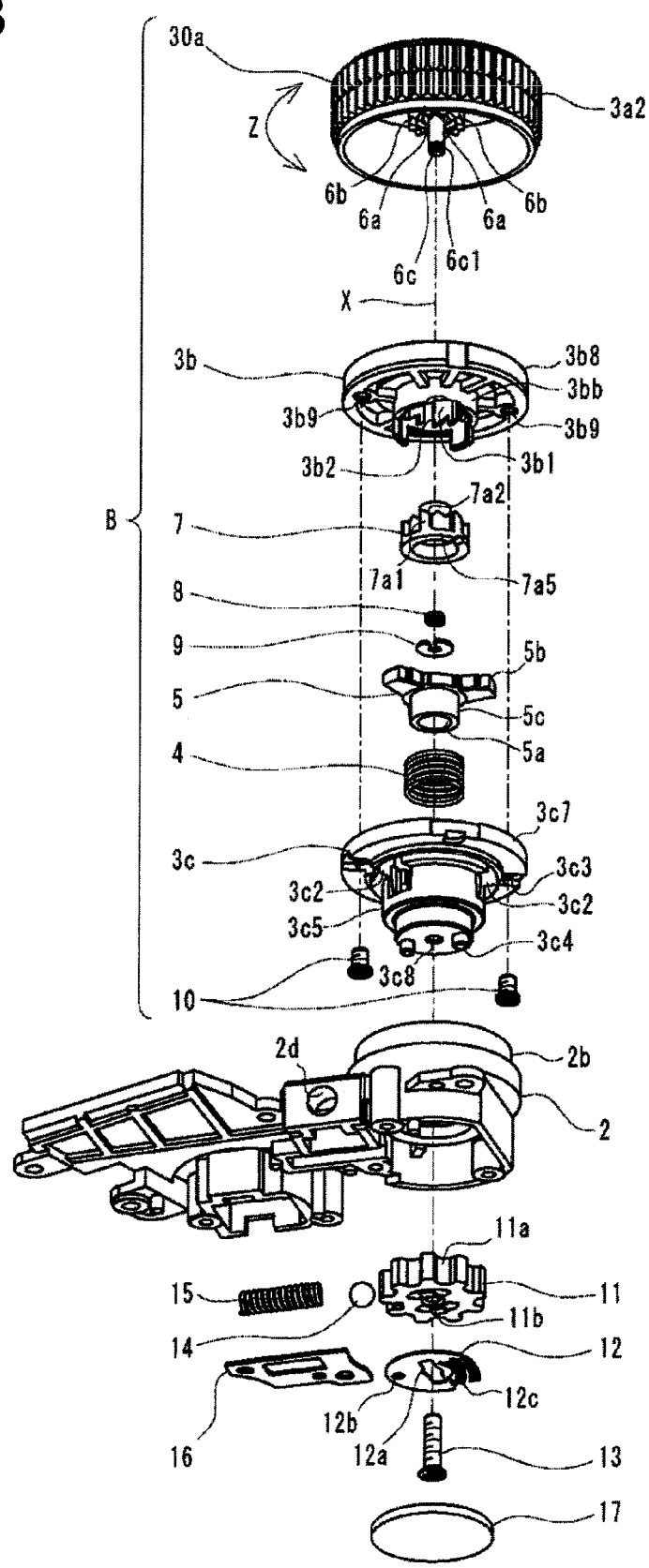
FIG. 13 is an exploded perspective view of the dial device in the second embodiment.

FIG. 13 is an exploded perspective view of the dial device A disassembled and viewed from an obliquely downward direction. FIG. 13 indicates that the lock button in the first embodiment is integrally configured with the dial exterior operation member.

Figure 14:
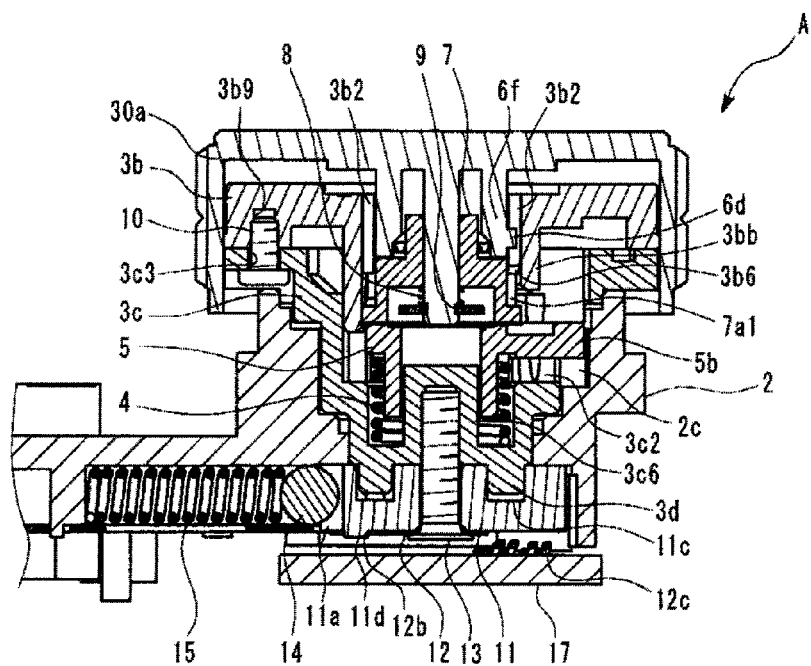
FIG. 14 is a sectional view of the dial device at time when a dial exterior operation member is present in a second position on a dial rotation axis.
Figure 15:
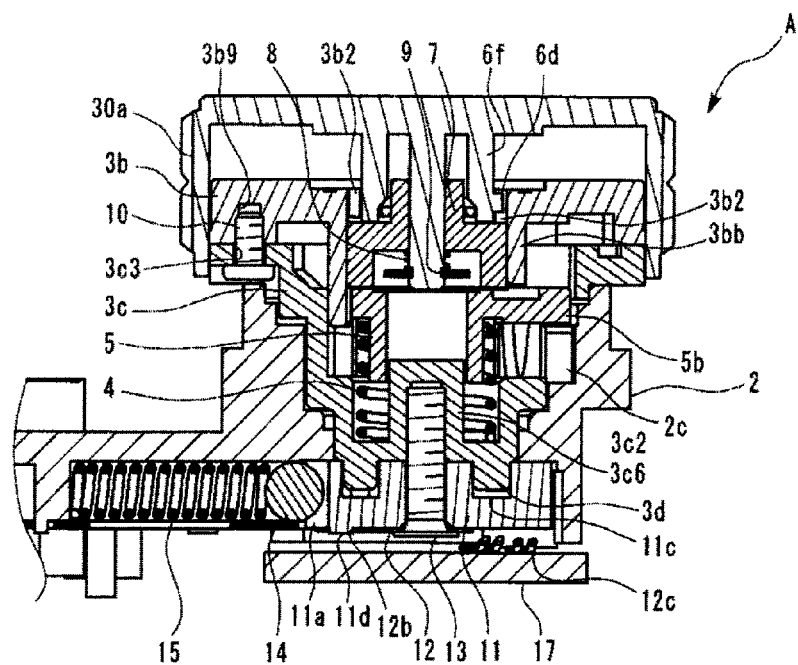
FIG. 15 is a sectional view of the dial device at time when the dial exterior operation member is present in a first position on the dial rotation axis.

FIG. 14 is a sectional view of the dial device A taken along longitudinally to include the rotation axis X of a dial assembly in the second embodiment and is a sectional view indicating that a dial is in the second state. FIG. 15 is a sectional view of the dial device A taken along longitudinally to include the rotation axis X of the dial assembly in the second embodiment and is a sectional view indicating that a dial is in the first state.

As shown in FIG. 13 to FIG. 15, in the present embodiment, a cylinder section 6f projecting downward substantially centering on the axis X is integrally fixedly provided on a lower surface of the dial exterior operation member 30a, which is dial means and a pressed member. In the first embodiment, the lock button 6 and the dial exterior operation member 30a are the separate components. In the second embodiment, the lock button 6 and the dial exterior operation member 30a are integrated. On a lower end face of the cylinder section 6f, a cam surface on which the unlock recessed sections 6a and the lock recessed sections 6b are alternately formed is formed. A plurality of projecting sections 6d projecting to a radial direction outer side are provided on an outer circumferential surface in a vicinity of the lower end face of the cylinder section 6f. In a center of the cylinder section 6f, the lock button shaft 6c having a round shaft shape substantially centering on the axis X is provided. The circumferential groove 6c1 is formed on a distal end portion outer circumference of the lock button shaft 6c. In the first embodiment, the screw lower hole 3a3 is provided in the dial exterior operation member 3a. However, a screw lower hole is not provided in the dial exterior operation member 30a in the second embodiment.

Note that the dial exterior operation member 30a, the cylinder section 6f, and the lock button shaft 6c may be integrally formed or may be firmly attached by an adhesive, screwing, or the like after being separately formed.

A shape of the lock control member 3b is also different in a configuration in one place according to the difference of the dial exterior operation member 30a in the second embodiment from the first embodiment. The different one place means that the screw-through holes 3b7 of the disk section 3b8 in the first embodiment are changed to screw lower holes 3b9 in which the screws 10 are screwed in the second embodiment. According to the difference, length of the screws 10 screwing in the screw lower holes 3b9 is smaller than length of the screws 10 in the first embodiment.

The dial assembly B in the second embodiment is configured by the dial exterior operation member 30a, the lock control member 3b, and the dial shaft member 3c. Besides, the dial assembly B is configured by the follower 7, the integration spring 8, the stop ring 9, the lock member 5, the urging spring 4, and the screws 10.

The dial assembly B in the second embodiment is assembled as explained below. First, the dial exterior operation member 30a and the follower 7 are combined and integrated. The lock button shaft 6c of the dial exterior operation member 30a is pierced through the opening hole 3b1 of the lock control member 3b to oppose the cam surfaces 6a1 and 6b1 of the dial exterior operation member 30a and the follower surfaces 7a2 of the follower 7 each other. The lock button shaft 6c of the dial exterior operation member 30a is further pierced through the pierce-through hole 7a3 of the follower 7. Thereafter, the integration spring 8 is inserted over the lock button shaft 6c. The inner diameter of the stop ring 9 is fit in the circumferential groove 6c1 of the lock button shaft 6c to prevent the integration spring 8 from coming off the lock button shaft 6c. At this point, the liner guide grooves 3b2 provided on an inner circumferential surface of the opening hole 3b1 of the lock control member 3b and projecting sections equivalent to the projecting sections 6d of the lock button 6 in the first embodiment fit with each other. Therefore, in this state, relative rotation of the dial exterior operation member 30a and the lock control member 3b is prohibited. The dial exterior operation member 30a, the follower 7, and the lock control member 3b are relatively movable in the axis X direction with respect to one another. In a static state in which external force is not applied, the cam surfaces 6a1 and 6b1 and the follower surfaces 7a2 are always in contact with each other by an urging force of the integration spring 8 (see FIG. 14).

The cam surfaces 6a1 and 6b1 and the follower surfaces 7a2 are capable of relatively moving to come into contact with and separate from each other with the urging force of the integration spring 8 and external force in the axial direction. In a state in which the cam surfaces 6a1 and 6b1 and the follower surfaces 7a2 are in contact with each other, if torque around the axis serving as external force is applied, the dial exterior operation member 30a, the lock control member 3b, and the follower 7 are capable of relatively rotating only in one direction while the follower surfaces 7a2 climb over the cam surfaces 6a1 and 6b1, the lock maintaining slopes 3b4, and the unlock shift slopes. An assembly obtained by assembling the dial exterior operation member 30a, the lock control member 3b, the follower 7, the integration spring 8, and the stop ring 9 is defined as a quasi-dial assembly.

Subsequently, the urging spring 4 is placed to be fit in the center shaft section 3c6 in the center opening recessed section 3c1 of the dial shaft member 3c. Further, the center opening 5a of the lock member 5 and the center shaft section 3c6 are fit to bend the urging spring 4 in the axial direction while the outer diameter of the barrel section 5c of the lock member 5 is fit in the inner diameter of the urging spring 4. At this point, the lock arms 5b of the lock member 5 are incorporated to fit in the lock openings 3c2 provided in the center opening recessed section 3c1 of the dial shaft member 3c. In this state, the relative rotation of the lock member 5 and the dial shaft member 3c is impossible but the relative movement in the axis X direction is possible.

Thereafter, while the lock member 5 is pressed not to come off the dial shaft member 3c, the disk section 3c7 of the dial shaft member 3c, in which the urging spring 4 and the lock member 5 are housed, and the disk section 3b8 of the quasi-dial assembly are placed one on top of the other in the rotation axis direction such that the lock member 5 and the follower 7 are opposed to each other. The screws 10 are pierced through the screw pierce-through holes 3c3 provided in the disk section 3c7 of the dial shaft member 3c and are screwed and fixed in the screw lower holes 3b9 provided in the disk section 3b8 of the lock control member 3b. Consequently, the dial assembly B is completed. Thereafter, the assembling of the dial device A is completely the same as the assembling in the first embodiment.

In the first embodiment, the dial exterior operation member is fixed to the lock control member 3b and the dial shaft member 3c. However, in the present embodiment, the dial exterior operation member 30a is capable of relatively moving in the axis X direction with respect to the lock control member 3b and the dial shaft member 3c. Relative rotation around the axis X is prohibited.

More specifically, in the dial exterior operation member 30a, the plurality of projecting sections 6d projecting to the radial direction outer side from the cylinder section 6f engage in the unlock grooves (the liner guide grooves) 3b2 of the lock control member 3b. The projecting sections 6d are slidable in the axis X direction in the unlock grooves 3b2. Relative rotation around the axis X between the dial exterior operation member 30a and the lock control member 3b is prohibited and relative movement in the axis X direction is enabled by the engagement of the projecting sections 6d and the unlock grooves 3b2.

As in the first embodiment, the follower 7 fit with the lock button shaft 6c in a slidable state. The follower 7 is urged toward the cam surface by the urging force of the integration spring 8.

As explained above, in the present embodiment, the cam surface on which the unlock recessed sections 6a and the lock recessed sections 6b are alternately formed is provided in the dial exterior operation member 30a disposed to be movable in the axis X direction relatively to the lock control member 3b. The cam surface comes into contact with the follower surfaces of the follower 7. Therefore, the dial exterior operation member 30a only includes the components of the lock button in the first embodiment and has action same as the action of the lock button in the first embodiment. That is, the action in the second embodiment is the same as the action in FIG. 7 to FIG. 10 explained in the first embodiment. However, reference numeral 6 shown in FIG. 7 to FIG. 10 in the first embodiment corresponds to reference numerals 6 and 30a in the second embodiment. Reference numerals 3a and 3b shown in FIG. 7 to FIG. 10 in the first embodiment correspond to one reference numeral 3b in the second embodiment.

Note that the dial exterior operation member 30a is axially fit and integrated with the follower 7. Further, the follower 7 is axially fit with the lock control member 3b as well. Therefore, a flange 7a5 (see FIG. 13) configured on one end face in the axial direction of the follower 7 and distal end portions in an X-axis direction of the unlock maintaining slopes 3*b*6 and distal end portions in the X-axis direction of the lock maintaining slopes 3*b*4 disposed on the inner circumferential surface of the cylinder section 3*bb* of the lock control member 3*b* can come into contact with each other. Therefore, the dial exterior operation member 30*a* does not come off the dial assembly B.

That is, as shown in FIG. 11 and FIG. 14, if, when a dial exterior operation member 30*b* is present in the first position, the dial exterior operation member 30*b* is pressed (depressed) from an upward direction by the operator and the pressing (the depression) is released and the dial exterior operation member 30*a* is present in the second position, the dial device A is in the lock state in which rotation around the axis X of the lock control member 3*b* relative to the base 2 is impossible. On the other hand, as shown in FIG. 12 and FIG. 15, if, when the dial exterior operation member 30*b* is present in the second position, the dial exterior operation member 30*b* is pressed (depressed) from the upward direction by the operator and the pressing (the depression) is released and the dial exterior operation member 30*a* is present in the first position located above the second position in the axis X direction, the dial device A is in the unlock state in which rotation around the axis X of the lock control member 3*b* relative to the base 2 is possible.

As explained above, the rotation around the axis X of the dial exterior operation member 30*a* relative to the lock control member 3*b* is regulated. Therefore, in the lock state, rotation of the dial exterior operation member 30*a* is also impossible.

On the other hand, in the unlock state, the rotation of the dial exterior operation member 30*a* is possible. The contact plate 12 rotates according to the rotation of the dial exterior operation member 30*a*. Therefore, the operator can optionally apply rotating operation to the dial exterior operation member 30*a*. Since the encoder function is added to the dial device A, it is possible to optionally select a target function and the like.

As explained above, the dial device A in the second embodiment can repeat the rotatable state and the unrotatable state of the dial exterior operation member 30*a* every time the dial exterior operation member 30*a*, which is the dial means and the pressed member, is depressed.

That is, in view of the explanation of the present invention, both of the first embodiment and the second embodiment of the present invention can be considered a dial device having a rotation preventing mechanism, the dial device including the fixed member 2, the rotatable rotary member 3*c* that receives rotating operation by the operator and rotates, the double knock mechanism including the pressed member (the lock button 6 in the first embodiment, the dial exterior operation member 30*a* in the second embodiment) movable to the first position and the second position on the rotation axis according to pressing operation by the operator, the follower 7 caused to perform rotation and movement in the axial direction according to the movement of the pressed member to the first position and the second position, and the control member 3*b* that rotates the follower 7 and controls movement of the follower 7 in the axial direction corresponding to the first position and the second position of the pressed member in order to alternately hold the pressed member 6, 30*a* in the first position and the second position every time the pressed member 6, 30*a* is pressed, the moving and engaging member 5 that is rotatable together with the rotation of the rotary member 3*c* and movable in the axial direction relatively to the rotary member 3*c* according to the axial direction position of the follower 7, the fixed side engaging section 2*a* that is provided in the fixed member 2 and is disengaged with the moving and engaging member 5 and allows the rotation of the rotary member when the pressed member 6, 30*a* is present in the first position and is engaged with the moving and engaging member 5 and prohibits the rotation of the rotary member when the pressed member 6, 30*a* is present in the second position, and the elastic member 4 that urges the moving and engaging member 5 in a direction from the second position to the first position of the pressed member 6, 30*a* and urges the pressed member 6, 30*a* in the direction from the second position to the first position via the moving and engaging member 5 and the follower 7. Further, the first embodiment can be considered the dial device having the rotation preventing mechanism, the dial device including the dial exterior operation member 3*a* rotatable around the center axis of the pressed member 6, wherein the dial exterior operation member 3*a*, the rotary member 3*c*, and the control member 3*b* are integrally provided, the rotary member 3*c* and the control member 3*b* are rotatable together with the dial exterior operation member 3*a*, and the pressed member 6 moves in the center axis direction relatively to the dial exterior operation member 3*a*. The second embodiment can be considered the dial device having the rotation preventing function, wherein the pressed member 30*a* is rotatable around the center axis and is the dial exterior operation member 30*a* that covers at least a part of the rotary member 3*c*.

Further, details of the configuration of the double knock mechanism are as explained below. That is, the pressed member (the lock button in the first embodiment, the dial member in the second embodiment) includes the first cam slopes (6*b*1) and the second cam slopes (6*a*1) alternately arranged in the circumferential direction to surround the rotation axis and is rotatable and movable to the first position and the second position in the direction of the rotation axis according to pressing operation by the operator, the follower (7) includes the cam followers (7*a*1) including the key-shaped parts that are provided in parallel to the rotation axis and rotate around the rotation axis and the pressed surfaces (7*a*2) that are provided on one end face of the key-shaped part, the pressed surfaces alternately coming into contact with the first cam slopes and the second cam slopes and rotating around the rotation axis in association with the movement of the pressed member to the first position and the second position, the control member is integrated with the rotary member, the groove sections (3*b*2) parallel to the rotation axis, the recessed sections (3*b*3) recessed in the direction parallel to the rotation axis, and the guide slopes (3*b*6), which are the inclined surfaces in contact with the pressed surfaces, are alternately arranged around the rotation axis to configure the control member, the cam followers are capable of fitting in the groove sections to be slidable in the axial direction, when the cam followers are fit in the groove sections, the pressed member is maintained in the first position and the moving and engaging member and the fixed side engaged section are disengaged via the cam followers, when the pressed member present in the first position is pressed in the direction of the second position, the cam followers located in the groove sections by the first cam slopes of the pressed member are displaced in the axial direction, disengaged from the groove sections, and rotated to engage with the recessed sections, the pressed member is held in the second position and the moving and engaging member is engaged with the fixed side engaged section via the follower, and, after the engagement, the pressed member present in the second position is pressed by the pressing operation by the operator, whereby the pressed surfaces of the cam followers are pressed by the second cam slopes to be detached from the recessed sections and given rotation, the guide slopes and the pressed surfaces of the cam followers come into contact with each other, and the guide slopes guide the cam followers into the groove sections.

Note that the present invention is not limited to the embodiments explained above and can be changed as appropriate in a range not departing from the gist or the idea of the invention read from the claims and the entire specification. A dial device involving such a change is also included in the technical scope of the present invention.

What is claimed is:

1. A dial device having a rotation preventing function, the dial device comprising:
    a fixed member;
    a rotary member that is rotatable around a rotation axis with respect to the fixed member according to rotating operation by an operator;
    a double knock mechanism including a pressed member movable to a first position and a second position on the rotation axis according to pressing operation by the operator, a follower that performs rotation around the rotation axis and movement in an axial direction according to the movement of the pressed member to the first position and the second position, and a control member that rotates the follower and controls movement of the follower in the axial direction corresponding to the first position and the second position of the pressed member in order to alternately hold the pressed member in the first position and the second position every time the pressed member is pressed;
    a moving and engaging member that is rotatable together with the rotation of the rotary member and, when the pressed member is pressed, the moving and engaging member is pressed via the follower of the double knock mechanism to be movable in the axial direction relatively to the rotary member according to the axial direction position of the follower;
    a fixed side engaging section that is provided in the fixed member and becomes disengaged with the moving and engaging member and allows the rotation of the rotary member when the pressed member is present in the first position and becomes engaged with the moving and engaging member and prohibits the rotation of the rotary member when the pressed member is present in the second position; and
    an elastic member that urges the moving and engaging member in a direction from the second position to the first position of the pressed member and urges the pressed member in a direction from the second position to the first position via the moving and engaging member and the follower.

2. The dial device having the rotation preventing function according to claim 1, further comprising an exterior dial member that is rotatable around a center axis of the pressed member, wherein
    the exterior dial member, the rotary member, and the control member are integrally provided, and the pressed member moves relatively to the exterior dial member in the center axis direction.

3. The dial device having the rotation preventing function according to claim 1, wherein the pressed member is rotatable around a center axis and is an exterior dial member that covers at least a part of the rotary member.

4. The dial device having the rotation preventing function according to claim 1, wherein the pressed member includes first cam slopes and second cam slopes alternately arranged in a circumferential direction to surround the rotation axis and is rotatable and movable in the first position and the second position in a direction of the rotation axis according to the pressing operation by the operator,
the follower includes cam followers including key-shaped parts that are provided in parallel to the rotation axis and rotate around the rotation axis and pressed surfaces that are provided on one end face of the key-shaped part, the pressed surfaces alternately coming into contact with the first cam slopes and the second cam slopes and rotating around the rotation axis in association with the movement of the pressed member to the first position and the second position, and
the control member is integrated with the rotary member, groove sections parallel to the rotation axis, recessed sections recessed in the direction parallel to the rotation axis, and guide slopes which are inclined surfaces in contact with the pressed surfaces, are alternately arranged around the rotation axis to configure the control member, the cam followers are capable of fitting in the groove sections to be slidable in the axial direction, when the cam followers are fit in the groove sections, the pressed member is maintained in the first position and the moving and engaging member and the fixed side engaging section are disengaged via the cam followers, when the pressed member present in the first position is pressed in a direction of the second position, the cam followers located in the groove sections by the first cam slopes of the pressed member are displaced in the axial direction, disengaged from the groove sections, and rotated to engage with the recessed sections, the pressed member is held in the second position and the moving and engaging member is engaged with the fixed side engaging section via the follower, and, after the engagement, the pressed member present in the second position is pressed by the pressing operation by the operator, whereby the pressed surfaces of the cam followers are pressed by the second cam slopes to be detached from the recessed sections and given rotation, the guide slopes and the pressed surfaces of the cam followers come into contact with each other, and the guide slopes guide the cam followers into the groove sections.

5. The dial device having the rotation preventing function according to claim 4, further comprising an exterior dial member rotatable around a center axis of the pressed member, wherein
    the exterior dial member, the rotary member, and the control member are integrally provided and rotatable together with the exterior dial member, and the pressed member moves relatively to the exterior dial member in the center axis direction.

6. The dial device having the rotation preventing function according to claim 4, wherein the pressed member is rotatable around a center axis and covers at least a part of the rotary member.

7. The dial device having the rotation preventing function according to claim 1, wherein the dial device includes a sliding contact section that rotates in a circumferential direction, an electric substrate having a fixed sliding pattern is provided on the fixed member side, and the sliding contact section is slidable on the sliding pattern.

8. The dial device having the rotation preventing function according to claim 2, wherein the dial device includes a sliding contact section that rotates in a circumferential direction, an electric substrate having a fixed sliding pattern is provided on the fixed member side, and the sliding contact section is slidable on the sliding pattern.

9. The dial device having the rotation preventing function according to claim 3, wherein the dial device includes a sliding contact section that rotates in a circumferential direction, an electric substrate having a fixed sliding pattern is provided on the fixed member side, and the sliding contact section is slidable on the sliding pattern.

10. The dial device having the rotation preventing function according to claim 4, wherein the dial device includes a sliding contact section that rotates in a circumferential direction, an electric substrate having a fixed sliding pattern is provided on the fixed member side, and the sliding contact section is slidable on the sliding pattern.

11. The dial device having the rotation preventing function according to claim 5, wherein the dial device includes a sliding contact section that rotates in a circumferential direction, an electric substrate having a fixed sliding pattern is provided on the fixed member side, and the sliding contact section is slidable on the sliding pattern.

12. The dial device having the rotation preventing function according to claim 6, wherein the dial device includes a sliding contact section that rotates in a circumferential direction, an electric substrate having a fixed sliding pattern is provided on the fixed member side, and the sliding contact section is slidable on the sliding pattern.

13. The dial device having the rotation preventing function according to claim 1, wherein the dial device is provided in an image pickup apparatus.

14. The dial device having the rotation preventing function according to claim 2, wherein the dial device is provided in an image pickup apparatus.

15. The dial device having the rotation preventing function according to claim 3, wherein the dial device is provided in an image pickup apparatus.

16. The dial device having the rotation preventing function according to claim 4, wherein the dial device is provided in an image pickup apparatus.

17. The dial device having the rotation preventing function according to claim 5, wherein the dial device is provided in an image pickup apparatus.

18. The dial device having the rotation preventing function according to claim 6, wherein the dial device is provided in an image pickup apparatus.

19. The dial device having the rotation preventing function according to claim 7, wherein the dial device is provided in an image pickup apparatus.

* * * * *